(No Model.) 2 Sheets—Sheet 1.
J. J. WALDNER.
INDICATOR FOR ENGINES.
No. 574,964. Patented Jan. 12, 1897.
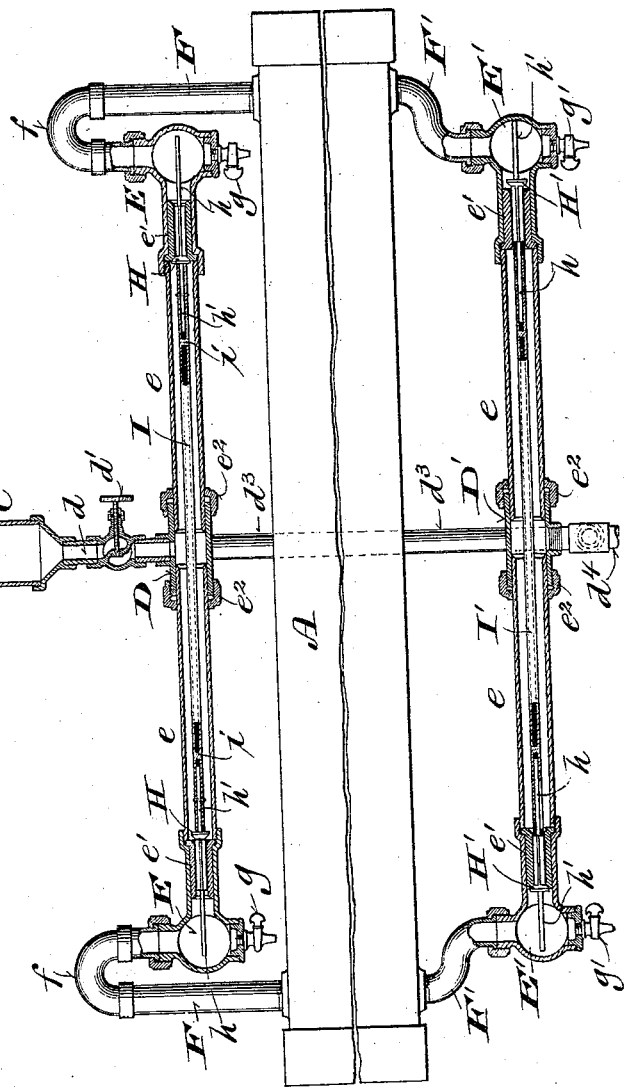
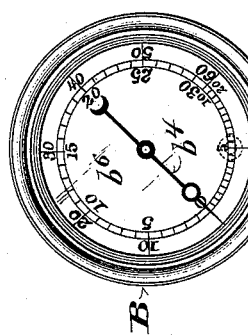
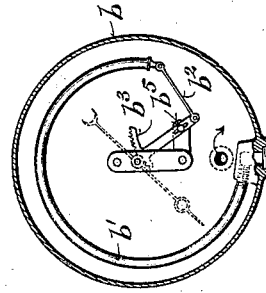
Witnesses:
Geo. W. Lowry.
Chas. L. Goss.
Inventor:
John J. Waldner,
By   Attorneys.

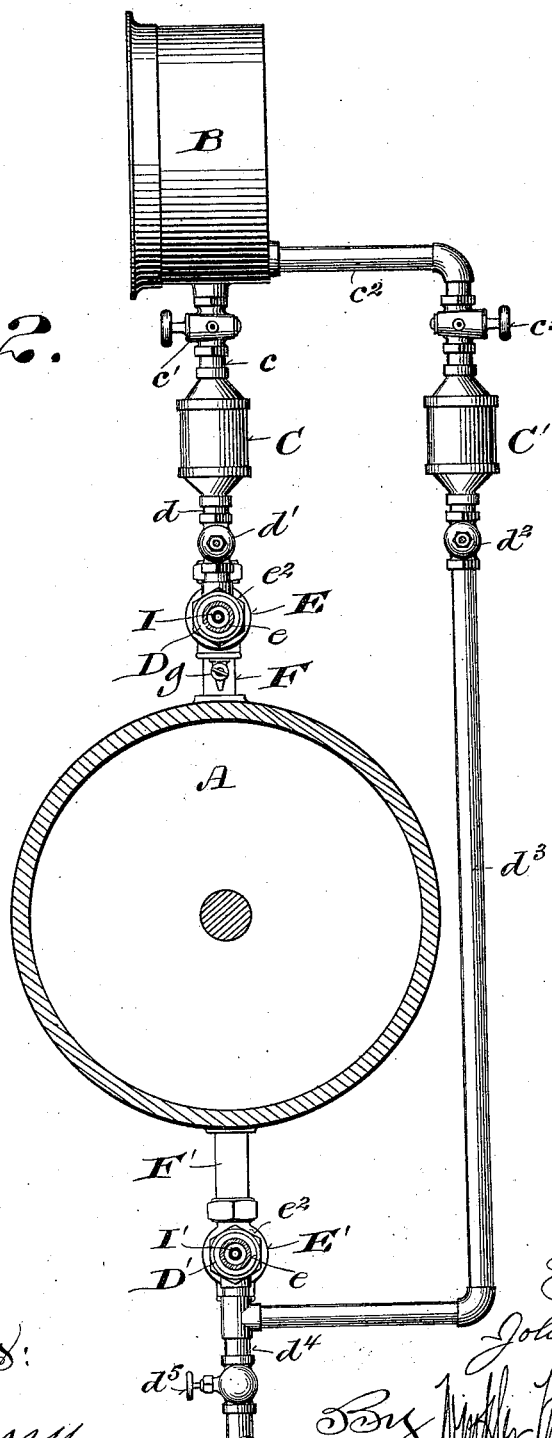

UNITED STATES PATENT OFFICE.

JOHN J. WALDNER, OF FREEMAN, SOUTH DAKOTA, ASSIGNOR OF ONE-EIGHTH TO JAKOB WIENS, OF GRETNA, CANADA.

INDICATOR FOR ENGINES.

SPECIFICATION forming part of Letters Patent No. 574,964, dated January 12, 1897.

Application filed October 4, 1895. Serial No. 564,607. (No model.)

*To all whom it may concern:*

Be it known that I, JOHN J. WALDNER, of Freeman, in the county of Hutchinson and State of South Dakota, have invented certain new and useful Improvements in Indicators for Engines; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of my invention are to directly ascertain the mean effective pressure or the horse-power of engines without computation, and incidentally thereto to automatically dispose of the water produced by condensation of steam in the cylinders of steam-engines.

It consists of certain novel features in the construction and arrangement of the component parts of the apparatus hereinafter specifically described, and pointed out in the claims.

In the accompanying drawings like letters designate the same parts in the several figures.

Figure 1 is a side elevation and vertical longitudinal section of my improved indicator and its connections as applied to an engine-cylinder, the greater portion of said cylinder being broken away to show the device in condensed space. Fig. 2 is an end elevation and vertical cross-section of the same; and Fig. 3 is a reverse view of the steam gage or indicator constituting a part of the device, the case of the indicator being shown in section.

A designates the cylinder of an engine, which may be supplied with steam or any other fluid actuating medium.

B designates an ordinary Bourdon steam gage or pressure-indicator, which is provided inside the casing $b$, which is made steam or air tight, with a curved hollow spring or tube $b'$, attached at one end to the case $b$, through which and the connections hereinafter described it communicates with the engine-cylinder. It is connected at its other free or unsupported end by a link $b^2$ with a segment-gear $b^3$, which meshes with a pinion on the arbor of an index-hand $b^4$. The pin or bearing $b^5$, on which the segment-gear $b^3$ turns, is made adjustable, so as to vary the leverage of the curved spring-tube $b'$ and its effect upon said gear and the index-hand.

The dial $b^6$, over which the index-hand $b^4$ vibrates, is graduated and has an outer scale designating mean effective pressure per square inch upon the engine-piston and an inner scale, constructed according to the area and speed of the piston of the particular engine to which the device is applied, designating horse-power. From the zero-point to the right the outer scale designates plus or positive pressure and to the left minus pressure or vacuum.

The spring-tube $b'$ is connected by a short pipe $c$, having a three-way valve or gage-cock $c'$, with the upper end of an expansion-chamber C, which is in turn connected by a short vertical tube or pipe $d$, having a needle-regulating valve $d'$, with a T-coupling D, through which it communicates with horizontal branch pipes $e\,e$ and valve-chambers E E. The valve-chambers E E are connected on the upper side with the ends of the cylinder A by tubes or pipes F F, having upwardly-projecting reverse bends $f\,f$. The valve-cases E E are provided with bushings $e'\,e'$, having valve-seats at both ends held therein by the tubes or pipes $e\,e$, which are threaded at their outer ends and screwed into said valve-cases. At their inner ends said pipes are inserted in opposite ends of the T D, and steam-tight slip-joints are formed between them and said T by internally-threaded flanged couplings $e^2\,e^2$. The expansion and contraction of the cylinder connections of the pressure gage or indicator are thus permitted without causing leakage. The valve-cases E are provided at the bottom with drain-cocks $g\,g$.

H H are reversible wing-valves provided at both ends with stems $h\,h'$ and adapted to the seats in either ends of the bushings $e'$. The stems $h'$ are inserted and pinned or otherwise secured in the ends of a tube I of such length as to hold one valve H open when the other is closed. It is plugged at $i$ to form an air-chamber, which tends to float it and sustain the valves H when the pipe connections are filled with water, and thus cause said valves to work with less friction.

The gage-chamber containing the spring-tube $b'$ is connected through a pipe $c^2$ and three-way valve or gage-cock $c^3$ with the top of an expansion-chamber C', Fig. 2, thence through a needle-regulating valve $d^2$ and pipe $d^3$ with valve-controlled branch connections leading to opposite ends of the cylinder on the under side and like or similar to those hereinbefore described, except that in this case the valves H' H' are reversed and their stems $h\ h$ are loosely inserted and held in the ends of the tube I', which is made of sufficient length to hold one valve open when the other is closed. A waste-pipe $d^4$, provided with a valve $d^5$ below the junction therewith of pipe $d^3$, leads out of the lower side of the T D'. The valves H' H' thus serve to automatically release the condensed steam from the engine-cylinder when the valve $d^5$ is opened, and the danger of forcing the cylinder-heads out is avoided.

My improved apparatus operates as follows: The pressure gage or indicator being connected with the cylinder, as shown in the drawings, to ascertain the mean effective pressure or horse-power the valves $d'$ and $d^2$ are adjusted so as to prevent the communication of sudden changes of pressure in the cylinder to the gage or indicator, and thus cause the index-hand of the gage to work steadily and designate on the outer scale of the gage the average pressure exerted upon the piston during each single stroke thereof. As the steam or other fluid-pressure medium enters either end of the cylinder it opens the valve H at that end, and through the tube I closes the valve H at the opposite end, which is open to exhaust, said tube I holding said first-mentioned valve open when the pressure in chamber C becomes greater than that in the cylinder until the driving medium is admitted to the opposite end of the cylinder and opens the other valve. The average pressure produced in the cylinder during each single stroke being thus communicated through the connections hereinbefore described to the interior of spring-tube $b'$ tends to straighten said tube and thereby turn the index-hand $b^4$. The chamber in which the spring-tube $b'$ is inclosed being connected alternately with the ends of the cylinder which are open to exhaust through the chamber C', valve-chambers E', and their pipe connections hereinbefore described, said spring-tube is subjected on the outside to the average pressure which tends to compress or bend and to the average vacuum which tends to expand or straighten said tube. Thus the index-hand $b^4$ is caused to indicate on the outer scale the mean effective pressure to which the piston is subjected and upon the inner scale the horse-power of the engine, the inner scale being constructed specially for the engine according to the area and speed of its piston. The bends $ff$ in the direct-pressure connections between the cylinder and gage cause the pipes $e\ e$ and valve-chambers E E to fill with water when steam is employed, and thus prevent waste of steam.

To ascertain the gain effected by vacuum in condensing-engines, the cock $c'$ is turned to close communication between the spring-tube $b'$ and chamber C and to admit air into said tube. The index-hand $b^4$ will now designate the average vacuum in pounds per square inch on the outer scale and the average horse-power gained by the vacuum on the inner scale. If the engine is non-condensing, the index-hand will be turned backward under these conditions and indicate back pressure, mean back pressure in pounds per square inch being designated by the outer scale and the horse-power corresponding to such back pressure being indicated on the inner scale. The back-pressure or vacuum connection through pipe $d^3$ may be made with the exhaust-pipe of the engine. This will be sufficient for ordinary purposes, but for greater accuracy the connections should be made with the cylinder, as shown and described. The waste-pipe $d^4$ may be led into a hot-well or feed-water heater. It will be observed that the check-valves H H' and their connections are reversible and interchangeable and may be employed either above or below the cylinder for direct or back pressure connections between it and the gage. The pipe connections F' may be made straight by simply lengthening the pipe-sections $e\ e$.

I do not wish to be understood as limiting myself to the exact details of construction herein shown and described, as they may be variously modified within the spirit and intended scope of my invention.

With compound engines each cylinder is to be provided with an indicator.

I claim—

1. In an indicator for engines the combination of a suitable gage or pressure-indicating device having connections for attachment to opposite ends of the engine-cylinder and valve mechanism constructed and arranged to automatically open and close communication alternately between opposite ends of said cylinder and said gage or pressure-indicating device, substantially as and for the purposes set forth.

2. In an indicator for engines, the combination of a suitable gage or pressure-indicating device having connections with opposite ends of the engine-cylinder and valve mechanism constructed and arranged to open and close communication alternately between the ends of said cylinder to which the actuating medium is admitted and from which the actuating medium is released and said gage or pressure-indicating device, substantially as and for the purposes set forth.

3. In an indicator for engines the combination with a pressure-gage comprising a spring-tube and pressure-indicating mechanism connected with said tube, of valve-controlled connections between said tube and opposite ends of the cylinder arranged to automatically establish communication between said tube and the ends of the cylinder to which the actuating medium is admitted, substantially as and for the purposes set forth.

4. In an indicator for engines the combination with a pressure-gage comprising a bent tube, an air-tight chamber inclosing said tube and pressure-indicating mechanism connected therewith, of valve-controlled connections between said tube and opposite ends of the cylinder constructed and arranged to automatically open communication between said tube and the ends of the cylinder to which the actuating medium is admitted, and valve-controlled connections between said chamber and the ends of the cylinder which are open to exhaust, substantially as and for the purposes set forth.

5. In an indicator for engines, the combination with a pressure-gage or indicating device, of connections between it and opposite ends of the cylinder, comprising an expansion-chamber, a regulating-valve and automatic check-valves between said expansion-chamber and opposite ends of the cylinder, substantially as and for the purposes set forth.

6. In an indicator for engines, the combination with a suitable pressure-gage or indicating device, of connections between said gage and opposite ends of the cylinder, comprising valve-chambers connected by upward bends or turns with the cylinder and provided with automatic check-valves constructed and arranged to open communication between said gage and the ends of the cylinder to which the actuating medium is admitted, substantially as and for the purposes set forth.

7. In an indicator for engines, the combination of a suitable gage or pressure-indicating device, valve-chambers connected with said gage or pressure-indicating device and with opposite ends of the cylinder and check-valves opening outwardly or away from the cylinder, and connected so that the opening of one causes the closing of the other, substantially as and for the purposes set forth.

8. In indicator or relief connections for engines, the combination of valve-chambers connected with opposite ends of the engine-cylinder and provided with reversible check-valves, a pipe connecting said valve-chambers with each other, and a tube connecting said valves, substantially as and for the purposes set forth.

9. In indicator and relief connections for engines, the combination of valve-chambers connected with opposite ends of the engine-cylinder through reverse bends, a horizontal pipe connecting said valve-chambers with each other, check-valves having seats in said chambers, and a tube connecting said valves and provided with an air-chamber, substantially as and for the purposes set forth.

10. In an indicator for steam-engines the combination of a pressure-indicating device having double connections for attachment to opposite ends of an engine-cylinder provided with valves for automatically and alternately opening and closing communication between opposite ends of the cylinder and said indicating device through each of said connections and two scales one indicating pressure and the other horse-power, substantially as and for the purposes set forth.

In testimony that I claim the foregoing as my own I affix my signature in presence of two witnesses.

JOHN J. WALDNER.

Witnesses:
W. VOSPER,
BERT GORNLEY.